(12) United States Patent
Ziegmann et al.

(10) Patent No.: US 9,138,741 B2
(45) Date of Patent: Sep. 22, 2015

(54) FILTER PIPETTE TIP

(75) Inventors: Christian Ziegmann, Ahrensburg (DE); Thomas Reimann, Geesthacht (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 13/408,462

(22) Filed: Feb. 29, 2012

(65) Prior Publication Data
US 2012/0156114 A1    Jun. 21, 2012

Related U.S. Application Data

(63) Continuation of application No. 11/347,815, filed on Feb. 3, 2006, now Pat. No. 8,192,699.

(30) Foreign Application Priority Data

Feb. 5, 2005   (DE) .......................... 10 2005 005 437

(51) Int. Cl.
| | |
|---|---|
| *B01L 3/02* | (2006.01) |
| *B01D 29/56* | (2006.01) |
| *B01D 29/58* | (2006.01) |
| *B01D 29/50* | (2006.01) |

(52) U.S. Cl.
CPC .............. *B01L 3/0275* (2013.01); *B01D 29/50* (2013.01); *B01D 29/56* (2013.01); *B01D 29/58* (2013.01); *B01L 3/02* (2013.01); *B01L 2200/0631* (2013.01); *B01L 2300/021* (2013.01); *B01L 2300/0681* (2013.01)

(58) Field of Classification Search
CPC ........ B01D 29/50; B01D 29/56; B01D 29/58; B01L 3/02

USPC ................................................. 422/524, 525
See application file for complete search history.

(56) References Cited

U.S. PATENT DOCUMENTS

| | | |
|---|---|---|
| 4,111,807 A | 9/1978 | Boomus et al. |
| 4,999,164 A | 3/1991 | Puchinger et al. |
| 5,156,811 A | 10/1992 | White |
| 5,364,595 A | 11/1994 | Smith |
| 5,693,273 A | 12/1997 | Wolbrom |
| 5,804,074 A | 9/1998 | Takiguchi et al. |
| 6,045,757 A | 4/2000 | Moriarty et al. |
| 6,123,905 A | 9/2000 | Torti et al. |
| 6,451,260 B1 | 9/2002 | Dusterhoft et al. |
| 6,551,608 B2 | 4/2003 | Yao |
| 6,638,610 B1 | 10/2003 | Yao |
| 6,710,093 B2 | 3/2004 | Yao et al. |

(Continued)

FOREIGN PATENT DOCUMENTS

| | | |
|---|---|---|
| DE | 78 04 147 | 8/1978 |
| DE | 36 35 598 | 5/1988 |

(Continued)

*Primary Examiner* — Jan Ludlow
(74) *Attorney, Agent, or Firm* — Vidas, Arrett & Steinkraus

(57) ABSTRACT

Filter pipette tip with a small tube with a relatively large aperture at one end for attaching to a pipette, a relatively small aperture at the other end for the passage of liquid and a through-channel between the large aperture and the small aperture and a porous filter arranged in the through-channel, filling up a portion of the through-channel and comprising at least two layers arranged in series in the direction of the through-channel of which a fine-pore layer has a pore size of a maximum of approximately 20 μm and a coarse-pore layer a pore size of approximately 20 to 50 μm, the two layers having different pore sizes.

26 Claims, 1 Drawing Sheet

(56) References Cited

U.S. PATENT DOCUMENTS

| | | |
|---|---|---|
| 6,808,908 B2 | 10/2004 | Yao et al. |
| 7,125,434 B2 | 10/2006 | Yavorsky et al. |
| 8,192,699 B2 | 6/2012 | Ziegmann et al. |
| 2002/0123156 A1 | 9/2002 | Tajima |
| 2003/0099576 A1 | 5/2003 | Li et al. |
| 2003/0211799 A1* | 11/2003 | Yao et al. ............ 442/361 |

FOREIGN PATENT DOCUMENTS

| | | |
|---|---|---|
| DE | 37 17 211 | 12/1988 |
| DE | 91 08 319 U | 10/1991 |
| DE | 196 48 131 | 5/1998 |
| DE | 197 23 469 | 12/1998 |
| DE | 198 06 780 | 7/1999 |
| DE | 699 04 971 | 6/2003 |
| EP | 0 588 564 | 3/1994 |
| EP | 1 095 703 | 5/2000 |
| JP | 63-785457 | 8/1988 |
| JP | 2004-340464 | 11/1992 |
| JP | 11347323 | 12/1999 |
| JP | 2003-254876 | 9/2003 |
| JP | 2005-501983 | 1/2005 |
| JP | 2005-187856 | 7/2005 |
| WO | 97/26540 | 7/1997 |
| WO | 97/29846 | 8/1997 |
| WO | 99/06149 | 2/1999 |
| WO | 99/67647 | 12/1999 |
| WO | 0029112 | 5/2000 |
| WO | 02/36708 | 5/2002 |
| WO | 03-022434 | 3/2003 |

* cited by examiner

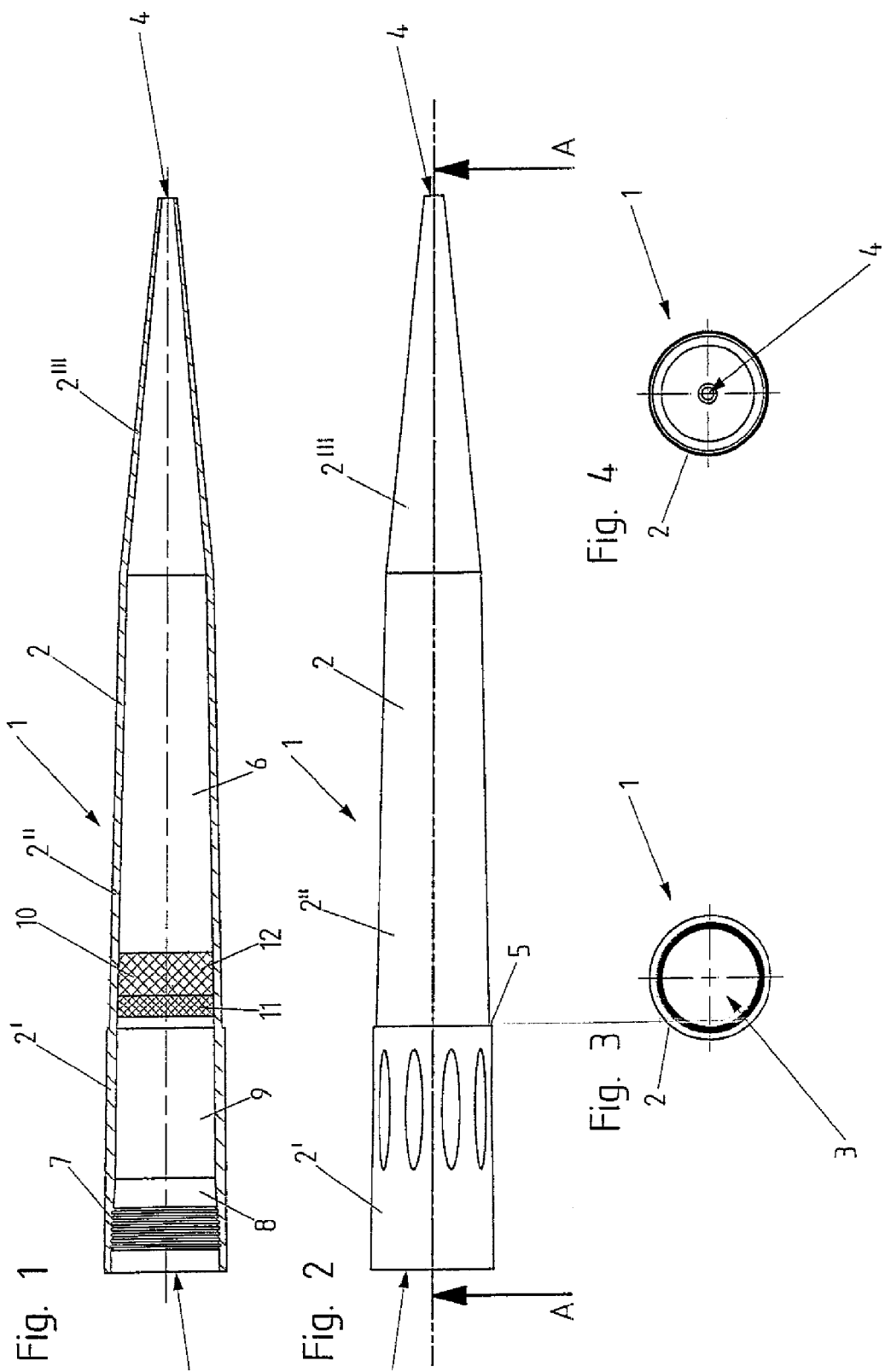

FILTER PIPETTE TIP

CROSS-REFERENCE TO RELATED APPLICATIONS

This application is a continuation of application Ser. No. 11/347,815, filed Feb. 3, 2006, the entire contents of which are hereby incorporated by reference.

STATEMENT REGARDING FEDERALLY SPONSORED RESEARCH

Not applicable.

BACKGROUND OF THE INVENTION

Pipette tips are used together with pipettes for metering liquids. Pipette tips are configured as small tubes with a relatively large aperture at one end for attaching to a pipette, a relatively small aperture at the other end for the passage of liquid and a through-channel between the large aperture and the small aperture. Pipettes have a receiving shaft for attaching the large aperture or a receiver for inserting one end of the pipette tip. They additionally have a gas displacement device which generally is configured as a piston and cylinder unit. The gas displacement device is attached via a through passage of the receiving shaft or the receiver to the large aperture of the pipette tip held releasably on the pipette.

An air column or another gas column is displaced by means of the gas displacement device, in order to aspirate liquid into the pipette tip and expel it therefrom. If the gas column is displaced away from the pipette tip, a specific amount of liquid is aspirated through the small aperture in the through-channel of the pipette tip. By displacing the gas column toward the pipette tip, an amount of liquid is dispensed from the through-channel through the small aperture.

Pipette tips are generally exchanged for fresh pipette tips after metering has been carried out, in order to prevent contamination of subsequently pipetted liquids by the remaining liquid. Single use pipette tips are generally made of plastics material.

When receiving and dispensing liquid, the finest droplets of liquid from the pipette tip can enter the pipette. With excessive gas displacement, large amounts of liquid can also be aspirated into the pipette through the large aperture. This liquid can enter the pipette tip during subsequent pipetting. As a result, this can lead to contamination of samples.

Filter pipette tips are already known for the prevention of contamination of the pipette. Said filter pipette tips have a porous filter filling up the cross-section of the through-channel. The filter is generally arranged in the vicinity of the large aperture. It is, for example, pressed into the through-channel of the small tube and/or supported on at least one projection in the through-channel. The region of the through-channel between the filter and small aperture serves to receive liquid. The filter retains aerosols and liquid in the filter pipette tip, so that they do not enter the pipette through the large aperture. Filters are, for example, configured as porous plugs made of plastics. They can be formed by sintering tiny plastics particles.

The barrier effect of known filters is insufficient for aerosols and liquids. Filters are already known with an additive which blocks the pores of the filter upon contact with the liquid. These filters are liquid tight but allow aerosols through. The additive can agglomerate and/or bleed out and contaminate a sample. Moreover, the frequently valuable liquid can be contaminated upon contact with the filter and/or is recovered with difficulty. The blocked filter thus does not allow the sample to be expelled.

A filter pipette tip is known from DE 36 35 598 C2 in which the filter is configured from a plurality of layers which are arranged on top of one another in a disc-like manner and have a progressive filter action, the permeability altering, in particular decreasing, from disc to disc. According to an embodiment, discs of different densities are layered on top of one another. With the increasing density, media which pass through repeatedly come into contact with wall portions of capillary passages. This can be utilised to initiate reactions but in turn also for increased filter action, namely when the suction or compression force reaches or exceeds a certain level. Thus the filter pipette tip has an increased loss of pressure which can result in metering inaccuracies or faulty operations.

A plurality of filter pipette tips is known with different characteristics. Thus, for receiving different metered quantities filter pipette tips are available in different sizes. Furthermore, filter pipette tips are known whose filters react in a particular manner upon contact with liquids, for example by obstruction or by altering their colour. Furthermore, filter pipette tips made of different materials and filter pipette tips with different levels of purity are known. Differentiating between the different filter pipette tips on the basis of their external appearance is problematic.

Proceeding therefrom, the object of the invention is to provide a filter pipette tip which has an improved barrier effect without impairing the pipetting.

Moreover, a filter pipette tip is to be provided which facilitates the differentiation of filter pipette tips with other characteristics.

BRIEF SUMMARY OF THE INVENTION

The filter pipette tip has a small tube with a relatively large aperture at one end for attaching to a pipette, a relatively small aperture at the other end for the passage of liquid and a through-channel between the large aperture and the small aperture and a porous filter arranged in the through-channel, filling up a portion of the through-channel, comprising at least two layers arranged in series in the direction of the through-channel, of which one layer has a pore size of a maximum of approximately 20 μm and another layer a pore size of approximately 20 to 50 μm, the two layers having different pore sizes.

The coarse-pore layer of the filter with a pore size of approximately 20 to 50 μm is used for volume- and pre-filtration. This layer is also referred to hereinafter as the coarse-pore layer. The coarse-pore layer offers a plurality of obstructions to a liquid passing through, on which droplets and/or particles can remain suspended. The fine-pore layer of the filter with a pore size of a maximum of approximately 20 μm separates droplets and/or particles, in particular with dimensions exceeding the pore size and which pass through the coarse-pore layer. This layer is also referred to hereinafter as the fine-pore layer. The adsorptive filter action on smaller particles is also optimally utilised in the fine-pore layer. The separation is almost complete, as the fine-pore layer fills up a portion of the through-channel and thus blocks the cross-section of the through-channel. The barrier effect exceeds the barrier effect of conventional single layer filters in which the small and large pores are distributed over the entire volume, so that the small pores are not able to retain completely the finest droplets and/or particles. As the filter is made up of a coarse-pore and a fine-pore layer, the pressure loss can correspond to the pressure loss of conventional, single layer filters, so that the metering accuracy is not impaired. An increased suction- or pressure force for achieving increased filtering effect is not required, in contrast to the known multi-layer filters. The filter tip can, in particular, be used during pipetting for preventing the penetration of aerosols or biomolecules (for example DNA) into the pipette or for separating liquid or solid particles from a liquid during filtration or extraction.

The pore size of the layers of the filter pipette tip according to the invention is determined by mercury intrusion such as stated in DIN 66133 of June 1993. Reference can be made to DIN 66133 via Beuth-Verlag GmbH, Burggrafenstrasse 6, 10787 Berlin. The information in DIN 66133 to which reference is made for carrying out and evaluating the measurements, is included in the present application. Measurement of the pore size of the layers which have been separated after splitting the filter (for example by cutting using a scalpel) into its two layers or into portions thereof, is carried out.

The pore sizes of the fine-pore layer and the coarse-pore layer are different, so that with a pore size of 20 µm of the fine-pore layer, the pore size of the coarse-pore layer is more than 20 µm. With a pore size of 20 µm of the coarse-pore layer, the pore size of the fine-pore layer is under 20 µm. According to an embodiment the pore size of the fine-pore layer is at least 5 µm smaller than the pore size of the coarse-pore layer. According to a further embodiment it is 10 to 40 µm smaller.

According to an embodiment the fine-pore layer has a pore size of a maximum of approximately 10 µm. According to a further embodiment, the coarse-pore layer has a pore size of approximately 20 to 40 µm.

The invention includes filter pipette tips in which the fine-pore layer of the filter is arranged closer to the small aperture than the coarse-pore layer. This embodiment can, for example, be meaningful in order to prevent contaminants from a pipette from penetrating the pipette tip. According to a preferred embodiment the fine-pore layer is arranged closer to the large aperture than the coarse-pore layer. This embodiment effectively prevents contamination of a pipette.

According to an embodiment, the extension of the fine-pore layer in the direction of the through-channel is smaller than the extension of the coarse-pore layer. By means of the relatively dense coarse-pore layer, particularly effective volume- and pre-filtration is achieved which, in combination with the fine filtration through the relatively thin fine-pore layer, further improves the barrier effect. Filter pipette tips in which the filters have more than two layers are also included. The filters can, for example, have a coarse-pore layer on either side of a fine-pore layer.

According to an embodiment, the filter pipette tip has a small tube with a relatively large aperture at one end for attaching to a pipette, a relatively small aperture at the other end for the passage of liquid and a through-channel between the large aperture and the small aperture and a porous filter arranged in the through-channel, filling up a portion of the through-channel, comprising at least two layers arranged in series in the direction of the through-channel, which are variably hydrophilic or variably hydrophobic or of which the one layer is hydrophilic and the other layer is hydrophobic.

The hydrophilic or more hydrophilic layer of the filter serves in particular for bonding droplets of aqueous liquids. Aerosols are preferably adsorbed by this layer. Similarly, DNA and similar biomolecules are preferably bonded on hydrophilic surfaces. The hydrophobic or more hydrophobic layer preferably serves for the adsorption of proteins, which preferably are bonded by hydrophobic layers. It further has a liquid repellent characteristic. The filter is at the same time, therefore, effective as an aerosol and biomolecule barrier. The barrier effect of the filter pipette tip is improved overall.

According to an embodiment, the filter pipette tip is designed in such a manner that the barrier effect is further increased.

According to an embodiment, the hydrophilic layer is arranged closer to the large aperture than the hydrophobic layer. During pipetting, the hydrophobic layer repels droplets of aqueous liquids and prevents them from entering the filter. Nevertheless, droplets which have penetrated the filter are bonded by the hydrophilic layer and prevented from escaping from the large aperture. Biomolecules such as DNA are captured by the hydrophilic layer.

According to an embodiment, the extension of the hydrophilic layer in the direction of the through-channel is greater than the extension of the hydrophobic layer. As a result, aqueous liquids are particularly effectively retained in the filter pipette tip.

According to an embodiment the filter pipette tip has a small tube with a relatively large aperture at one end for attaching to a pipette, a relatively small aperture at the other end for the passage of liquid and a through-channel between the large aperture and the small aperture and a porous filter arranged in the through-channel filling up a portion of the through-channel with at least one marking.

The marking is at least one additional feature of the filter which identifies a characteristic and/or orientation of the filter pipette tip and/or of the filter. The feature—optionally after previous physical or chemical action—may be determined by means of a human sense organ (for example the eye) and/or a sensor (for example a photosensor).

The marking can serve various purposes. For example, the marking serves to identify the filter pipette tip. For example, a specific marking of the filter is associated with a filter pipette tip with a specific characteristic and which allows the filter pipette tip with the relevant feature to be clearly determined. The marking identifies, for example, the receiving volume of the filter pipette tip for liquid samples, specific reactions of the filter upon contact with one or different liquids, materials from which the filter pipette tip is manufactured, the level of purity with which the filter pipette tip is provided or the manufacturer of the filter pipette tip.

Moreover, the marking can serve as a feature of originality or authenticity, which, for example, allows the originality or authenticity of the filter pipette tip to be determined To check the originality and/or authenticity the filter, according to an embodiment, is provided with a marking which can be determined by means of technical aids, for example by checking the filter by means of special testing equipment and/or after chemical or physical action (for example by purging with air during pipetting, wetting with reagents or heating) on the filter, so that the marking undergoes a change and the change can be perceived by human senses or determined by means of a sensor.

The marking can further serve the purpose of identifying the orientation of the filter during production in order to insert said filters in the correct position in the filter pipette tip. With filters with a plurality of layers attached to one another or a pore size which can be changed in the axial direction, from time to time it is not possible to detect their orientation easily. In this case the marking which is easily detectable by human sensory perception and/or by means of a sensor can be used to determine the respective orientation of the filter in order to insert said filter in the desired orientation in the through-channel.

Different markings can, in particular, be selected with regard to the respective purpose. For example, the marking is a profiling on an end face of the filter arranged parallel to the layers and which may be detected visually externally and/or by touch. According to an embodiment, the filter has at least one coloration which differs from the conventional white coloration of the filter. In this connection the marking is a coloration of the filter or a portion thereof differing from a white coloration. The coloration can be selected from all chromatic colours (for example blue, green, yellow, red) and/or from all achromatic colours with the exception of white (i.e. black and grey tones). The filter is, for example, completely coloured. When it is only partially coloured, the remaining portion is completely or partially white and/or has at least one further coloration differing from white. The coloration can be produced by using coloured plastics granulate during the manufacture of the filter. Preferably, inert plastics are used, out of which colours cannot leach or only with difficulty. Moreover, pigments are preferred which do not contaminate molecular biological samples.

According to an embodiment, the filter comprises at least two layers arranged in series in the direction of the through-channel and which have different markings or of which one has a marking and the other has no marking.

According to an embodiment, the filter has at least two layers with different colorations and arranged in series in the direction of the through-channel. In this embodiment, the markings are colorations of layers of the filter.

The colorations of the filter are very easily identifiable. This can be used during production for the insertion of the filter in the correct position into the filter pipette tip. When the filter pipette tip has been produced, the colorations of the filter can be identified very easily, for example through the apertures of the small tube and/or through a small tube which is of at least partially transparent design. The colorations can be much more easily identified, than for example a marking attached during injection moulding as a profile to the surface of the small tube or by printing onto the surface of the small tube. As a result, the colorations are an excellent means of identifying the filter pipette tip.

Specific colorations of the filter can be associated with filter pipette tips with specific characteristics which allow it to be clearly established whether the filter pipette tips have the relevant characteristics. For example, filter pipette tips which are designed for receiving different metered quantities, whose filters react in a specific manner upon contact with different liquids, which consist of different materials or have different levels of purity are provided with clear markings. It is also possible, by means of the coloration of the filter, to indicate a specific manufacturer. The markings can be used for mechanical identification of filter pipette tips, for example during production or during handling in laboratory equipment or during visual identification by laboratory personnel.

The colorations can be selected from all chromatic colours (for example blue, green, yellow, red) and/or achromatic colours (black, white and grey tones). The colorations can be created by using coloured plastics granulate during manufacture of the filter. Preferably inert plastics are used out of which colours cannot leach or only with difficulty. Moreover, pigments are preferred which do not contaminate molecular biological samples.

According to a further embodiment, the layer of the filter arranged closer to the small aperture is white. The white colour indicates to the user that the filter pipette tip has an inert filter.

According to an embodiment, the filter has at least one fluorescent additive. In this connection, the marking is a fluorescent additive. By excitation by means of suitable radiation (for example UV radiation) it is possible to bring the fluorescent additive to fluorescence. This allows an identification of marked filters and/or filter tips and/or their orientation, if the additive has a specific arrangement within the filter. As a result, a filter pipette tip with specific characteristics and/or the orientation of a filter can be identified, which is useful for inserting the filter in the correct position in the small tube. The authenticity of the filter pipette tips can also be checked by detecting fluorescent additives.

According to an embodiment, the filter has at least two layers with different fluorescent additives and/or has at least one layer with a fluorescent additive and at least one layer without fluorescent additive. The filter is repeatedly marked by means of the different fluorescent additives. Furthermore, the association of fluorescent additives to one or more layers of the filter allows the identification of the position of the filter.

The small tube is, according to an embodiment, transparent in the region surrounding the filter, so that the filter is visible from outside. According to a preferred embodiment the small tube is, as a whole, transparent.

According to an embodiment, the filter pipette tip has a small tube with a relatively large aperture at one end for attaching to a pipette, a relatively small aperture at the other end for the passage of liquid and a through-channel between the large aperture and the small aperture and a porous filter arranged in the through-channel, filling up a portion of the through-channel which contains a superabsorber.

The superabsorber swells upon contact with liquid and seals the filter, so that liquid which has penetrated does not pass through and enter a pipette possibly attached to the filter pipette tip and contaminate said pipette. Superabsorbers have a better swelling behaviour than the additives introduced into filters of conventional filter pipette tips with a cellulose-based (cellulose gum) liquid barrier effect. A liquid barrier is achieved by means of superabsorbers. The filter remains, however, permeable to air, so that an aspirated sample can be relatively easily recovered. To this end the pipette is operated as when conventionally dispensing liquid, so that excess pressure bearing against the large aperture expels the liquid from the filter pipette tip.

Superabsorbers can absorb large amounts of water, with a high level of swelling. Superabsorbers cannot be dissolved easily in liquid samples. These abilities are typical of polymers, which contain ionic groups. The most widely distributed superabsorbers are based on cross-linked polyacrylic acids. Superabsorbers generally are available in powder form, generally white in colour. The particle sizes are, for example, in the range between several 10 µm and several 100 µm. The company Degussa AG markets a superabsorber suitable for the use according to the invention under the brand name 'Creasorb Product Z 1069'. The company BASF markets a further superabsorber which is also suitable for the use according to the invention under the brand name 'Luquasorb B 1110'.

The superabsorber can be integrated into the porous filter in different ways. For example, it is possible to design the filter with a plurality of layers, between which a layer made from the superabsorber is arranged. According to a preferred embodiment, the superabsorber is layered in hollow spaces of the filter. The superabsorber is held in the hollow spaces in the filter. Here, if necessary, it comes directly into contact with penetrating liquid, so that it more or less blocks the hollow spaces and prevents the passage of liquid.

According to an embodiment, the filter comprises at least two layers arranged in series in the direction of the through-channel of which one layer contains the superabsorber.

The layer without superabsorber can serve different purposes. For example, it improves the filter effect in the aforementioned manner. Additionally, or instead of which, it prevents the leaching out and/or agglomeration of the superabsorber and contaminating the liquid sample. With conventional filter pipette tips with self-sealing filters, the additive can leach out and agglomerate and contaminate samples, so that for example a PCR is inhibited. With conventional filter pipette tips, this problem is further exacerbated upon contact with liquid. The filter pipette tip according to the invention allows the sample to be recovered even with brief contact with the filter, as the layer without superabsorber prevents the superabsorber from being carried away with the liquid. Moreover, compared with conventional filter pipette tips, the liquid only comes into contact with the additive later.

According to an embodiment the layer containing the superabsorber is arranged closer to the large aperture than the layer without superabsorber. As a result, the liquid sample is kept away from the superabsorber and/or the layer without superabsorber prevents contact of the liquid sample with the superabsorber.

According to an embodiment, the layer containing the superabsorber is arranged between layers without superabsorber. As a result, the filter action can be improved and/or the superabsorber can be prevented from escaping from both ends of the filter.

According to an embodiment, the layer without superabsorber has a pore size of a maximum of approximately 50 μm. This layer prevents superabsorber from passing through, where the particle size is of a minimum of approximately 50 μm. According to a further embodiment, the layer without superabsorber has a pore size of a maximum of approximately 30 μm. This layer prevents superabsorber from passing through, where the particle size is a minimum of approximately 30 μm.

According to an embodiment, the filter or the layer of the filter containing the superabsorber contains approximately 10 to 30 wt % superabsorber. With this weight proportion, the superabsorber already exhibits a good barrier effect for liquid, it being possible, however, for the air permeability to remain.

The following embodiments refer to all the aforementioned filter pipette tips.

According to an embodiment, at least one layer of the filter is functionalised. The functionalising produces, for example, increased bonding of specific molecules to the relevant layer. The functionalising is, for example, produced by the addition of appropriate powdery additives during the manufacture of the filter. Possible functionalising means are reversed phase materials such as C18, ion exchangers, activated carbon or the like.

According to a further embodiment different layers of the filter are functionalised differently.

According to an embodiment the layers of the filter are freely layered on top of one another.

According to an embodiment the layers of the filter are attached to one another by a one-piece filter body. The one-piece filter body has advantages for handling during the manufacture of the filter pipette tips. Moreover, gaps reducing the barrier effect between the different layers are avoided. The one-piece filter body has an increased barrier effect with consistent excellent flow behaviour. This filter is, for example, made in one piece or has layers joined together and attached to one another.

According to an embodiment, the through-channel between the small aperture and the filter comprises a receiving volume for receiving a liquid sample and the through-channel between the filter and the large aperture is a channel for displacing a gas column. The receiving volume, according to an embodiment, has a defined nominal size, so that the user can select a suitable filter pipette tip for a specific metering task.

The small tube is, for example, manufactured by injection moulding from suitable plastics (for example polyethylene (PE) or polypropylene (PP)).

The filter is, for example, made by a plastics granulate being introduced into a mould and compressed for the first layer, then a plastics granulate is introduced into the mould and compressed for a second layer, the layers are sintered and subsequently the filter body expelled from the mould. A filter body which has just one layer can be manufactured by the granulate for the single layer being introduced into the mould, compressed, sintered and subsequently the filter body being expelled. Before being introduced into the mould, an additive is optionally intermixed into a granulate for one of the layers or into the granulate for the entire filter body. The plastics granulate for the single layer or multi-layer filters is, for example, made of polyethylene (PE), in particular made of UHMW-PE (Ultra High Molecular Weight Polyethylene).

According to an embodiment a filter pipette tip system comprises at least one filter pipette tip and a filter pipette tip with a single layer filter, the flow resistance of the filter substantially corresponding to different filter pipette tips. With the filter pipette tip system, the metering accuracy is not impaired if a filter pipette tip with a single layer filter is exchanged for a filter pipette tip with a multi-layer filter. With pipettes which are designed for filter pipette tips with single layer filters, it is possible to change to filter pipette tips with multi-layered filters, without the metering accuracy being impaired. Moreover, single layer and multi-layer filter pipette tips can be used in any sequence whilst retaining the pipetting characteristics.

According to an embodiment, a filter pipette tip system, comprises a plurality of filter pipette tips which have variable characteristics, the filter of the filter pipette tips with different characteristics having different markings or orientation. Correspondingly, filter pipette tips with different characteristics can be differentiated by the different markings (for example coloration) of their filters or by using identically marked (for example coloured) filters with different orientations.

According to an embodiment supporting the differentiability, the filters of the filter pipette tips with different characteristics have different dimensions.

According to an embodiment, a filter pipette system comprises a filter pipette tip and/or a filter pipette tip system of the aforementioned type and a pipette with at least one receiving shaft for attaching the large aperture of a filter pipette tip or at least one receiver for inserting the end with the large aperture of a filter pipette tip and at least one gas displacement device attached to a through aperture of the receiving shaft or the receiver.

According to an embodiment the invention relates to the use of a filter pipette tip of the aforementioned type and/or of a filter pipette system of the aforementioned type and/or a filter pipette system of the aforementioned type for receiving at least one liquid sample through the small aperture in the through-channel between the small aperture and filter by applying reduced gas pressure at the large aperture and for dispensing the liquid sample through the small aperture by applying increased gas pressure at the large aperture and for blocking the through-channel between the filter and the large aperture against the entry of aerosols and/or the liquid sample by means of the filter.

According to a further embodiment the application relates to recovering the liquid sample which have penetrated the filter by applying increased gas pressure at the large aperture.

According to an embodiment, the invention relates to a method for determining the orientation of a multi-layered filter for a filter pipette tip by detecting the position of a boundary between two layers by introducing ultrasound into the filter and measuring the ultrasound emerging from the filter. By ultrasonic detection it is possible to differentiate the position of the boundary between different layers of a filter which in their porosity, density or other physical characteristic differ from one another. The orientation of the filter can be determined by the position of the boundary between the layers. This can be used for inserting the filter in the correct position into a small tube of a filter pipette tip.

Appropriate ultrasound testing methods are known from materials testing for non-destructive testing of work pieces for tears or other defects. These methods are based on the fact that ultrasonic waves are diffused in a linear manner in fixed homogenous materials but reflected at interfaces with air or another material. With ultrasonic transmission methods an ultrasonic beam is introduced into the workpiece and on the opposite side its intensity measured with a sound receiver. With the reflection method the sound energy reflected from a defect in the workpiece is measured. Additionally, the sound transmitter simultaneously serves as a receiver for the ultrasonic pulses. The distance between the workpiece surface and the defect can be inferred from the delay time. According to the invention this testing technique is useful for determining the boundary between two layers of a filter.

The invention is described in more detail hereinafter with reference to the accompanying drawings of an embodiment, in which:

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 is a longitudinal section of the filter pipette tip;

FIG. 2 is a lateral view of said filter pipette tip;

FIG. 3 is a top view of said filter pipette tip;

FIG. 4 is a view from below of said filter pipette tip.

The filter pipette tip 1 has a small tube 2 which has a relatively large aperture 3 at one end and a relatively small aperture 4 at the other end. Generally, the small tube 2 tapers from the end with the large aperture 3 toward the end with the small aperture 4. Between the apertures 3, 4, said small tube has portions 2', 2", 2''' the portions 2', 2" being separated by a shoulder 5. Externally, they have approximately the same conicity. The portion 2''' is however more conical in design than the aforementioned portions.

A through-channel 6 extends between the large aperture 2 and the small aperture 3. The portion 2' has a plurality of internal circumferential projections 7 which serve for sealingly attaching to the conical projection of a pipette. In the attachment region 8 the through-channel 6 is relatively conical. A portion 9 of reduced conicity is adjacent thereto. In the portions 2", 2''', the internal conicity respectively corresponds with the external conicity.

A filter 10 is pressed into the through-channel 6, into the portion 2" adjacent to the portion 2'. The filter 10 fills up a portion of the through-channel 6 completely. The filter 10 is in one piece and comprises two layers 11, 12. The fine-pore layer 11 arranged closer to the large aperture 3 has a pore size of a maximum of approximately 20 µm, the coarse-pore layer 12 arranged closer to the aperture 4 has a pore size of approximately 20 to 50 µm. The pore sizes are measured by mercury intrusion according to methods described according to DIN 66 133 after splitting the filter 10 into the two layers, for example by means of a scalpel. The two layers 11, 12 of the filter 10 consist of sintered UHMW-PE.

The layers 11 and 12 have a different coloration. Preferably the fine-pore layer 11 has a chromatic colour or is black or grey and the coarse-pore layer 12 has a white colour. The coloration is determined by using appropriately coloured granulate during the manufacture of the filter 10.

The layer 11 is hydrophilic and the layer 12 is hydrophobic. This characteristic is implemented by additives which are added to the granulate for the manufacture of the filter 10.

For pipetting, the filter pipette tip 1 is attached to a pipette, the placement region 8 being placed on a projection. During aspiration of liquid into the passage 6 between the small aperture 4 and the filter 10, aerosols are prevented by the filter 10 from penetrating the pipette. In this connection, volume- and pre-filtration is effected by the coarse-pore layer 12. The fine-pore layer 11 retains the finest droplets.

The coloration and/or colour combination of the filter 10 is coded, i.e. a specific colour code is associated with the filter pipette tip 1 with specific characteristics. By referring to the coloration of the filter 10, the user can easily identify which type of filter pipette tip 1 is present.

Accordingly, other filter pipette tips 1 are equipped with filters 10 which have various colour combinations.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A filter pipette tip with a small tube with a relatively large aperture at one end for attaching to a pipette, a relatively small aperture at the other end for the passage of liquid and a through-channel between the large aperture and the small aperture and a porous filter comprising a first layer, arranged in the through-channel filling up a portion of the through-channel which contains a superabsorber, wherein the filter comprises a second layer arranged in series with the first layer in the direction of the through-channel, the first layer containing the superabsorber being arranged closer to the large aperture than the second layer without superabsorber, and wherein the first layer comprises a compressed intermixture of the superabsorber and a first plastics granulate, the second layer comprises a compressed second plastics granulate, and wherein the first and second layers of the filter are sintered to one another to form a one-piece filter body.

2. The filter pipette tip according to claim 1, in which the layer without superabsorber has a pore size of a maximum of approximately 50 μm.

3. The filter pipette tip according to claim 1, in which the layer containing the superabsorber of the filter contains approximately 10 to 30 wt % superabsorber.

4. The filter pipette tip according to claim 1, in which the first layer of the filter is functionalised.

5. The filter pipette tip according to claim 4, in which the first layer is comprised of two different layers of the filter which are functionalised differently.

6. The filter pipette tip according to claim 1, in which the filter has a press fit in the through-channel and/or is supported on at least one projection in the through-channel.

7. The filter pipette tip according to claim 1, in which the through-channel between the small aperture and the filter comprises a receiving volume for receiving a liquid sample and between the filter and the large aperture is a channel for displacing a gas column.

8. The filter pipette tip according to claim 1, comprising at least two layers, comprised of the first layer and the second layer, arranged in series in the direction of the through-channel of which the first layer is a fine-pore layer and has a pore size of a maximum of approximately 20 μm and the second layer is a coarse-pore layer and has a pore size of approximately 20 to 50 μm, the two layers having different pore sizes.

9. The filter pipette tip according to claim 8, in which the fine-pore layer has a pore size of a maximum of approximately 10 μm and/or the coarse-pore layer a pore size of approximately 20 to 40 μm.

10. The filter pipette tip according to claim 8, in which the fine-pore layer is arranged closer to the large aperture than the coarse-pore layer.

11. The filter pipette tip according to claim 8, in which the extension of the fine-pore layer in the direction of the through-channel is smaller than the extension of the coarse-pore layer.

12. The filter pipette tip according to claim 1, the porous filter arranged in the through-channel filling up a portion of the through-channel comprising at least two layers, comprised of the first layer and the second layer, arranged in series in the direction of the through-channel which are variably hydrophilic or variably hydrophobic or of which one of the first and second layers is hydrophilic and the other layer is hydrophobic.

13. The filter pipette tip according to claim 12, in which the hydrophilic layer is arranged closer to the large aperture than the hydrophobic layer.

14. The filter pipette tip according to claim 12, in which the extension of the hydrophilic layer in the direction of the through-channel is smaller than the extension of the hydrophobic layer.

15. The filter pipette tip according to claim 1, the porous filter arranged in the through-channel filling up a portion of the through-channel has at least one marking.

16. The filter pipette tip according to claim 15, in which the filter has at least one coloration which differs from a white coloration.

17. The filter pipette tip according to claim 16, in which the coloration is selected from the achromatic colours with the exception of white and from the chromatic colours.

18. The filter pipette tip according to claim 15, in which the first layer and the second layer are arranged in series in the direction of the through-channel, and have different markings or of which one has a marking and the other has no marking.

19. The filter pipette tip according to claim 15, in which the first layer and second layer have different colorations.

20. The filter pipette tip according to claim 19, in which the colorations of the first layer and second layer are selected from the achromatic and/or the chromatic colours.

21. The filter pipette tip according to claim 19, in which the second layer facing the small aperture is white.

22. The filter pipette tip according to claim 15, in which the filter has at least one fluorescent additive.

23. The filter pipette tip according to claim 15, in which the first layer and second layer have different fluorescent additives and/or has one layer of the first and second layers has a fluorescent additive and the other layer is without fluorescent additive.

24. The filter pipette tip according to claim 1, in which the small tube at least in the region surrounding the filter is transparent.

25. The filter pipette tip according to claim 1 for recovering a liquid sample which has penetrated the filter by applying increased gas pressure at the large aperture.

26. A method for determining the orientation of a multi-layered filter for a filter pipette tip, comprising the steps of:
providing the filter pipette tip of claim 1, and
detecting the position of a boundary between two layers by introducing ultrasound into the filter and measuring the ultrasound emerging from the filter.

* * * * *